(12) United States Patent
Davis

(10) Patent No.: US 7,586,413 B2
(45) Date of Patent: Sep. 8, 2009

(54) HUMAN FEEDBACK USING PARASITIC POWER HARVESTING OF RFID TAGS

(75) Inventor: Michael L. Davis, Amherst, NY (US)

(73) Assignee: Assa Abloy AB, Stockholm (SE)

( * ) Notice: Subject to any disclaimer, the term of this patent is extended or adjusted under 35 U.S.C. 154(b) by 261 days.

(21) Appl. No.: 11/464,739

(22) Filed: Aug. 15, 2006

(65) Prior Publication Data
US 2007/0046468 A1    Mar. 1, 2007

Related U.S. Application Data

(60) Provisional application No. 60/714,159, filed on Sep. 1, 2005.

(51) Int. Cl.
*G08B 13/14* (2006.01)
(52) U.S. Cl. .............. 340/572.1; 340/5.8; 340/571; 340/572.7; 340/572.8; 340/693.1; 340/693.5
(58) Field of Classification Search .......... 340/572.1, 340/572.7, 572.8, 10.1, 10.6, 571, 691.4, 340/691.5, 691.6, 693.5, 5.8, 693.1
See application file for complete search history.

(56) References Cited

U.S. PATENT DOCUMENTS

| | | | |
|---|---|---|---|
| 2,813,242 A | 11/1957 | Crump | |
| 4,297,557 A | 10/1981 | Tyler et al. | |
| 4,685,047 A | 8/1987 | Phillips | |
| 5,151,684 A * | 9/1992 | Johnsen | 340/572.1 |
| 6,219,543 B1 | 4/2001 | Myers et al. | |
| 6,608,551 B1 * | 8/2003 | Anderson et al. | 340/572.1 |
| 6,812,838 B1 | 11/2004 | Maloney | |
| 6,816,083 B2 | 11/2004 | Brandt | |
| 6,882,128 B1 | 4/2005 | Rahmel et al. | |
| 7,071,824 B2 | 7/2006 | Trosper | |
| 2003/0169574 A1 | 9/2003 | Maruyama et al. | |
| 2004/0092311 A1 | 5/2004 | Weston et al. | |
| 2004/0189476 A1 | 9/2004 | Borovoy et al. | |
| 2005/0024211 A1 * | 2/2005 | Maloney | 340/572.1 |
| 2006/0244592 A1 * | 11/2006 | Kansala et al. | 340/572.1 |

FOREIGN PATENT DOCUMENTS

| | | |
|---|---|---|
| EP | 0713196 | 5/1996 |
| EP | 1310890 | 5/2003 |
| EP | 1345183 | 9/2003 |
| EP | 1681779 | 7/2006 |
| JP | 01116786 | 5/1989 |

(Continued)

OTHER PUBLICATIONS

European Search Report and Opinion for European Patent Application No. 06119394.2, dated Oct. 31, 2007.

(Continued)

*Primary Examiner*—Thomas J Mullen
(74) *Attorney, Agent, or Firm*—Sheridan Ross P.C.

(57) ABSTRACT

The present invention is directed toward secure access systems. Specifically, a radio frequency (RF) enabled device is provided that includes an RF powered human feedback element. An interrogator emitting an RF field may control the human feedback element through the RF field such that information may be transmitted from the interrogator to the device.

57 Claims, 8 Drawing Sheets

FOREIGN PATENT DOCUMENTS

| | | |
|---|---|---|
| JP | 11-259619 | 9/1999 |
| JP | 2002279526 | 9/2002 |
| WO | WO02003856 | 1/2002 |
| WO | WO02099730 | 12/2002 |
| WO | WO 2006/100206 | 9/2006 |

OTHER PUBLICATIONS

Analytical Spectral Devices, Inc., ASD NIR Technology for Counterfeit Detection, retrieved from http://www.asdi.com/about-counterfeit.asp on Jun. 24, 2005, copyright 2004, 1 page.

Auto ID Labs, Auto-ID Lab St.Gallen, retrieved from http://www.m-lab.ch/auto-id/sigac.html on Jun. 25, 2005, Apr. 19, 2005, 1 page.

Brand Protect USA, Two Day PIRA International Conference, Mar. 31, 2004, 5 pages, New York, USA.

Colder Products, Smart Coupling Technology FAQ's, copyright 2005, 3 pages.

Walsh, Irish Invention Spots Fakes by 'Fingerprints', London Sunday Times, Nov. 15, 1998, 1 page.

Microtrace, Microtaggant- Microscopic Encoded Particles, retrieved from http://www.microtaggant.com/encoded-particles.htm on Jun. 27, 2005, copyright 2004, 2 pages.

Tata Consultantcy, Product Genealogy & Authentication Solution, retrieved from http://www.tcs.com/rfid-solutions/Solutions/Product-Genealogy.aspx on Jun. 27, 2005, copyright 2005, 2 pages.

Sun Microsystems, Protect Your Brand with Tracking Technology, retrieved from http://www.sun.com/br/lifesciences_902/feature_protect.hmtl on Jun. 27, 2005, copyright 2003, 4 pages.

RFID with Tagsys, Press Release, Tagsys chosen by Oracle for their RFID/EPC demonstration at the World Economic Forum, retrieved from http://www.tagsysrfid.com/rfid_news-78-2-1.html on Jun. 24, 2005, Feb. 6, 2004, 1 page.

Texas Instruments, Product Authentication, Raising the Bar for Fraudsters, retrieved from http://www.ti.com/rfid/docs/ applications/prodid.shtml on Jun. 24, 2005, copyright 2005, 1 page.

Verify Brand, What is Verify Brand?, retrieved from http://www.verifybrand.com/index.php on Jun. 27, 2005, 2 pages.

Netlink, Passive Tags, retrieved from http://www.rfid.ae/howdoesitwork_passivetags.asp on Jun. 24, 2005, copyright 2003-2005, 2 pages.

Atmel, Application Note On Tag Tuning, 2005A-RFID-07/02, copyright 2002, 7 pages.

Finkenzeller, Physical Principals of the RFID System, Fundamentals and Applications in Contactless Smart Cards and Identification, Second Edition, Copyright 2003, pp. 61-159, ISBN 0-470-84402-7, John Wiley & Sons, Ltd.

Paradiso et al., Energy Scavenging for Mobile and Wirelesss Electronics, Pervasive Computing, Jan. 2005, pp. 18-27, 1536-1268/05, IEEE CS and IEEE ComSoc.

Feldmeier et al., Giveaway Wireless Sensors for Large-Group Interaction, Responsive Environments Group, Apr. 24, 2004, 2 pages.

Starner et al., Human Generated Power for Mobile Electronics, Low Power Electronics Design, 2004, 28 pages, CRC Press.

EDA Board.com, LED powered by RF, retrieved from http://www.edaboard.com/viewtopic.php?p=331608 on Jun. 22, 2005, Mar. 2004, 3 pages.

Matzan, A4Tech NB-50: Batteryless and wireless mouse, News Forge, May 27, 2005, 5 pages.

Paradiso, Parasitic Power Harvesting at the MIT Media Lab, DARPA, retrieved from www.media.mit.edu/resenv on Jun. 2005, 33 pages.

Paradiso, Renewable Energy Sources for the Future of Mobile & Embedded Computing, Responsive Environments Group MIT Media Laboratory, Mar. 2000, 45 pages.

Kingsbury, Keely Netmail List Turning ambient EM into power, retrieved from http://www.keelynet.com/interact/ Arc_7_98-12_98/00000213.htm on Jun. 24, 2005, Jul. 31, 1998, 7 pages.

Feldmeier et al., Ultra-Low-Cost Wireless Motion Sensors for Musical Interactions with very Large Groups, UBICOMP 2001, 6 pages.

Auto-ID Labs, Special Interest Group Anti-Counterfeiting, Jan. 2005, 6 pages.

Authentix, Consumer Goods Applications, retrieved from http://www.authentix.com/consumer.asp on Jun. 2005, 8 pages.

\* cited by examiner

HUMAN FEEDBACK USING PARASITIC POWER HARVESTING OF RFID TAGS

This application claims benefit of U.S. Provisional Patent Application Ser. No. 60/714,159, filed Sep. 1, 2005, which is herein incorporated by this reference in its entirety.

FIELD OF THE INVENTION

The present invention is generally directed to secure access transponders and access cards like radio frequency identification (RFID) devices. Specifically, embodiments of the present invention provide a human feedback element coupled with an RFID transponder, where both feedback element and the transponder may use power from RF signals generated by a source external to the RFID device like an interrogator.

BACKGROUND

As possible applications for RFID devices grow, passive RFID devices, like RFID transponders or tags, are becoming more prevalent and widely used. Most of the largest users of RFID tags are in the supply chain management market place. Here, companies utilize passive RFID tags by the millions to tag consumer products. In a car production process, individual car parts, like doors, stereo, engine components, etc. may be tagged with individual RFID devices in order to keep track of each part of the eventual final product. Other products like clothes are tagged in the supply chain in order to keep an accurate account of every product as it passes from one entity to the next.

Passive RFID tags do not have an internal power source, like a battery. This is done in order to keep costs of the RFID tags low and the size and weight of the tags at a minimum. Because passive RFID tags have no internal power source, they must harvest energy from RF signals produced by external objects. Usually, an RFID reader or interrogator emits an RF field in order to establish a communications link between the RFID reader/interrogator and an RFID device. The RFID devices harvest the inherent energy in the RF field to power their circuitry. Once the RFID device has received power from an external field, it may generate a message and begin transmitting a communication to the RFID reader/interrogator or another receiver. The communications between the interrogator and RFID device are typically initiated to determine some amount of information about the RFID device.

Harvesting RF power is not a new concept. A classic example of RF power harvesting can be seen in old-fashioned crystal radios that draw their power directly from AM radio stations. Some radios harvest enough power to even drive headphones for the radio. A more modern example of RF power harvesting can be found in aftermarket modules that can be connected to a cellular phone and light up when the cell phone rings. The modules harvest the RF signals that are being sent to the cell phone in order to power the lights.

One problem with current identification and security systems is that some companies will buy a single interrogator and the corresponding firmware or chips from a particular vendor and copy the firmware from the purchased devices to use in other interrogators that were not purchased from the original vendor. These companies are exploiting the work of the vendor to produce illicit interrogators that run on the same firmware even though the copies of that firmware were not paid for. Additionally, the vendor would like to ensure that copies of the chips are not being used with other interrogators not purchased from the vendor. In other words, a vendor usually requires a customer to pay for each copy of the chip that is being used in the customer's system. Some entities will buy a particular number of chips but create copies of them for use in more interrogators. These entities are essentially stealing chips from the vendor.

There exists a need for a device that can quickly and easily be used for product and/or brand authentication of a given interrogator without actually taking apart the reader/interrogator or performing an in depth analysis of the reader/interrogator. There also exists a need for a product and method that can be used by a person to quickly query a reader/interrogator in order to determine if it is functioning properly and what if any maintenance is required for that reader/interrogator.

Sometimes in secure access systems, a person will present an RFID device to a reader/interrogator and not receive response. This may be because the holder of the RFID device is not authorized to access the asset that is being protected by the given reader/interrogator. However, it is also possible the reader/interrogator and/or the RFID device may not be functioning properly. There is typically no way for the holder of the RFID device to know the difference between these problems. Furthermore, one problem may require the person to take a certain course of action, like talk to security personnel to show that they are in fact authorized to access the given asset. While another problem may require the person to talk to maintenance personnel to fix the reader/interrogator. It would be much more efficient if the person could learn what the problem was and why they were not granted access to the asset. There do exist some reader/interrogators that will attempt to relay this type of information to a holder of the RFID device by blinking a light, creating a display, or making some noise. However, if the reader/interrogator is not functioning properly, there is no guarantee that this information will be relayed to the holder of the RFID device properly.

SUMMARY

The present invention is generally directed toward a RFID device that is equipped with a human feedback element and methods of controlling and using the same.

In accordance with one embodiment of the present invention, an RFID device is provided. The RFID device comprises a transponder integrated circuit, a human feedback element, and a first antenna. The first antenna is operable to transform magnetic flux from a magnetic field into an electrical signal having electrical energy, where the electrical energy is used to power at least a portion of the transponder integrated circuit and the human feedback element.

The RFID device may be used, in certain embodiments of the invention, to quickly query interrogators or other devices. The RFID device may be placed within an active zone of an interrogator such that a magnetic field produced by the interrogator is used to power and/or control the human feedback element on the RFID device. An authorized interrogator (i.e., an interrogator with a certified copy of software) will control the human feedback element on the RFID device indicating that the RFID device is certified and authentic. On the other hand, an interrogator employing unauthorized software may not be able to correctly control the human feedback element and therefore the user of the RFID device can determine that the interrogator is using uncertified software. The RFID device may query the interrogator about what types of software/firmware are currently being used by the interrogator in order to determine if a certified copy of software is being used in the interrogator.

The RFID device may also be implemented as a part of a game or toy. Some toys with a human feedback element and RFID transponder may be used to create different reactions based on the magnetic field that is presently powering the human feedback element. Additionally, a game may produce different magnetic fields in order to control the human feedback element in different fashions according to rules of the game and so on.

In accordance with another embodiment of the present invention, a method of scanning an interrogator with an RFID device is provided that comprises a transponder and a human feedback element that are each partially powered by energy supplied by a magnetic field created by the interrogator. The method comprises placing the RFID device within an active region of the interrogator. Then generating a message to send to the interrogator and transmitting that message. Then receiving a reply from the interrogator in the form of an altered magnetic field and indicating the results of the reply with the human feedback element.

In accordance with yet another embodiment of the present invention, a method of powering an RFID transponder and human feedback element, both of which are operatively associated with a common substrate is provided. The method comprises providing a magnetic field, then receiving a message from the transponder. In response to receiving the message from the transponder, generating a response and transmitting the response, where the response comprises altering a magnetic field in order to control the human feedback element.

The magnetic field may be altered in a number of ways. For example, the magnetic field may be turned on for a period of time, and then turned off at a different period of time. This process of intermittently turning the magnetic field on and off may be repeated in a predetermined pattern such that the human feedback element is controlled and displays a particular message to the holder of the RFID device. The magnetic field may also be altered by changing the magnitude of the magnetic field, thereby changing the amount of energy that is supplied to the human feedback element. The magnetic field may be altered in response to receiving a prompt from the transponder as noted above. Alternatively, the magnetic field may be altered in response to determining an authenticity of the transponder (e.g., determining that the transponder or holder thereof is valid and can access a particular asset or determining that the transponder or holder thereof is not valid and cannot access a particular asset).

In accordance with a further embodiment of the present invention, an interrogator is provided. The interrogator comprises an antenna that is operable to create a magnetic field, transmit RF messages, and receive RF messages. The interrogator further comprises a processor for generating messages to be transmitted by said interrogator and for analyzing messages received at the interrogator. When the interrogator receives a message a response is generated that is transmitted by the antenna altering the magnetic field produced thereby.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figure 1:
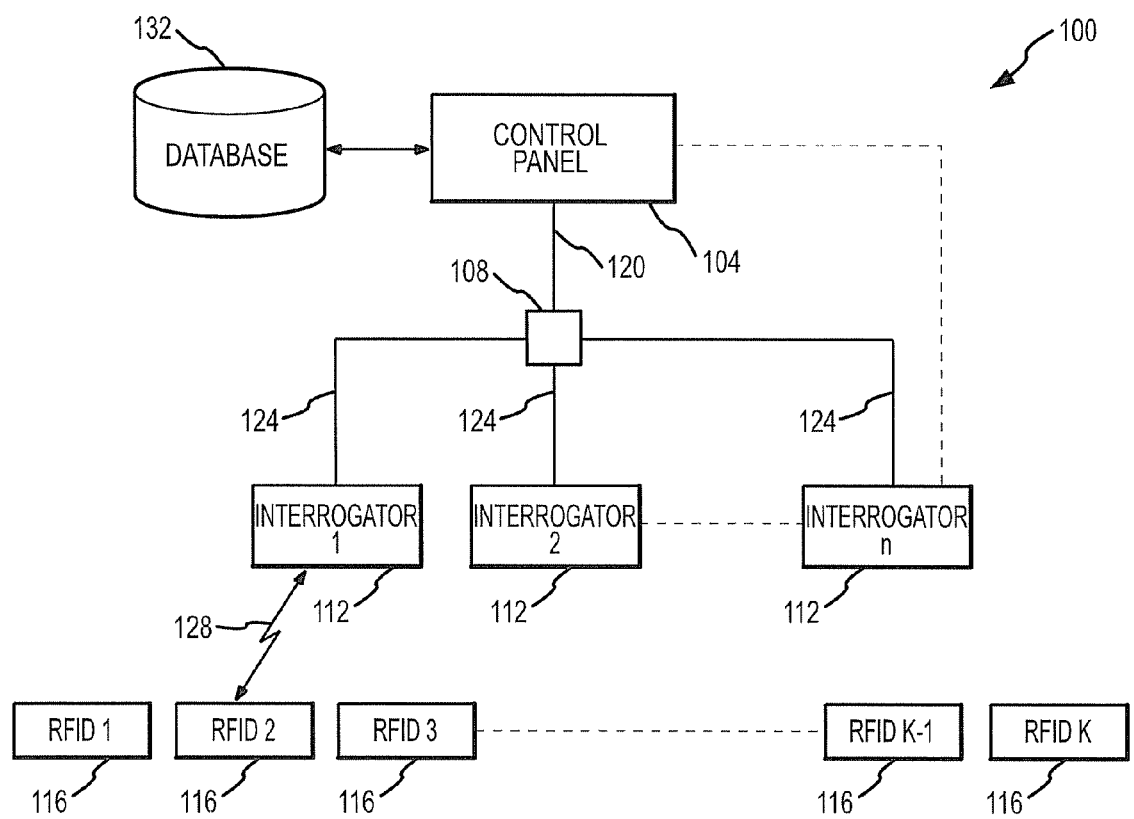
FIG. 1 is a diagram depicting an exemplary access control or security system in accordance with embodiments of the present invention.

The present invention generally is directed toward radio frequency (RF) secure access systems and RF identification (RFID) devices that include a human feedback element. The invention advantageously addresses deficiencies of the prior art and may be utilized within the context of security systems, as well as be equally efficiently utilized in a broad range of other applications using interactive computerized data acquisition techniques, both contactless or requiring a physical contact with a carrier of pre-programmed information (e.g., monitoring moving objects, tracking inventory, verifying credit cards, and the like). Referring initially to FIG. 1, an access system 100 where at least one RFID device 116 is used will be described in accordance with embodiments of the present invention. In the depicted embodiment, the system 100 comprises a control panel 104, a hub 108, a plurality of interrogators $112_{1-n}$, and a plurality of RFID devices $116_{1-k}$ such that n and k are integers wherein $n \geq 1$, $k \geq 1$, and typically k is greater than n. The plurality of interrogators $112_{1-n}$ may include interrogators 112 of the same type, as well as interrogators of different types. For example, a subset of the plurality of interrogators $112_{1-n}$ may be legacy interrogators (e.g. interrogators using older transmission protocols). Whereas another subset of the plurality of interrogators $112_{1-n}$ may be new interrogators utilizing more secure technologies. A subset of the plurality of interrogators $112_{1-n}$ may be used in relation to a first application and may be provided by a first vendor. A second subset of the plurality of interrogators $112_{1-n}$ may correspond to a second application and may be provided by a second different vendor.

In the depicted embodiment, the interrogators 112 are coupled to the control panel 104 via the interconnecting hub 108 through interfaces 120 and 124. In an alternate embodiment, the interrogators 112 may be directly coupled to the respective inputs/outputs of the control panel 104. Interfaces 120 and 124 between the interrogators 112, the hub 108, and the control panel 104 are generally bi-directional interfaces, which may selectively be implemented in a form of wired, wireless, fiber-optic communication links, or combinations thereof. Even though the interfaces 120 and 124 are depicted as bi-directional interfaces, one of skill in art can appreciate that the interfaces 120 and 124 may be implemented as unidirectional interfaces that use a unidirectional communication protocol, for example, the Wiegand protocol.

As can be appreciated by one of skill in the art, the interfaces 120 and 124 may be implemented utilizing buses or other types of connections. For example, the I/O ports may be one or more of a USB port, parallel port, serial port, Small Computer Systems Interface (SCSI) port, modem, Ethernet, and/or an RF interface. The protocols used to communicate between the control panel 104 and the interrogators 112 may include one or more of the TCP/IP protocol, RS 232, RS 485, Current Loop, Power of Ethernet (POE), Bluetooth, ZigBee, GSM, WiFi, and other communication methods and protocols known in the art.

Typically bi-directional RF interfaces 128 between an interrogator 112 and the RFID device 116 are automatically established when the RFID device 116 is placed in an active zone of the interrogator. As used herein, the active zone of a Radio Frequency (RF) interrogator 112 is defined as a three dimensional space where intensity of RF signals emitted by the interrogator exceeds a threshold of sensitivity of the RFID device 116 and intensity of RF signals emitted by the RFID device 116 exceeds a threshold of sensitivity of the interrogator 112.

The RFID device 116 may also be implemented in a number of other forms including, but not limited to, a contact smart card, a contactless smart card, a proximity card, a magnetic stripe card, a Wiegand card, a PDA, a cellular phone, a sticker, a label, a key-fob, and any other type of device used to store and transmit data relating a particular application. The active zone for each type of RFID device 116 may vary based upon the type of communications used between the interrogator 112 and the RFID device 116. For example, a magnetic stripe card is placed in the active zone of the interrogator 112 when it is swiped through the interrogator 112. As can be appreciated by one of skill in the art, the interface 128 is created upon presentation of the RFID device 116 to the interrogator 112 such that communications between the two is facilitated.

The control panel 104 may be a general-purpose computer adapted for multi-task data processing and suitable for use in a commercial setting. Alternatively, the control panel 104 may be implemented with a host computer and interrogators 112 can be connected to the host computer via a TCP/IP connection or other type of network connection. A memory of the control panel 104 comprises software program(s) containing a database of records for the system 100. Alternatively, a database 132 may be separated from the control panel 104 as depicted in FIG. 1. The database 132 whether integral to the control panel 104, separate from the control panel 104, or both, maintains records associated with the interrogators 112, RFID devices 116 and their respective holders or users, algorithm(s) for acquiring, decoding, verifying, and modifying data contained in the interrogators 112, algorithm(s) for testing authenticity and validity of the RFID devices 116, and algorithm(s) for implementing actions based on the results of these tests. Specific configurations of the control panel 104 are determined based on and compliant with computing and interfacing capabilities of the interrogators 112 and/or the hub 108.

As used herein, in reference to an individual or an object associated with a RFID device 116, the terms a "holder" and a "user" are used interchangeably.

Each interrogator 112 is adapted for exchanging information with the control panel 104 and for requesting data from the RFID device 116 placed in the active zone of the interrogator 112. The interrogator 112 may also be adapted for processing at least a portion of the data acquired from the RFID device 116. Alternatively, processing of the acquired data may be performed using the control panel 104 exclusively. In one embodiment, the interrogator 112 generates signals facilitating execution of the results of interrogating the RFID device 116 (e.g., engages/disengages a locking mechanism, allows/disallows movement of a monitored article, temporarily disables itself, activates an alarm system, updates a database, and the like). Alternatively, the control panel 104 may generate such signals.

In accordance with embodiments of the present invention, a stand-alone interrogator 112 may be utilized to perform the functionality of both the interrogator 112 and the control panel 104. This stand-alone interrogator may include, or have access to, the database that contains data used to determine the authenticity of a RFID device and/or algorithm(s) used to make the determination of authenticity of the RFID device 116. A determination of authenticity for a RFID device is made at the receiving point rather than having to transmit data across a network from the interrogator to a control panel 104 in order to make a determination of authenticity. The stand-alone interrogator is further operable to execute instructions based upon the analysis of the RFID device 116.

Figure 2:
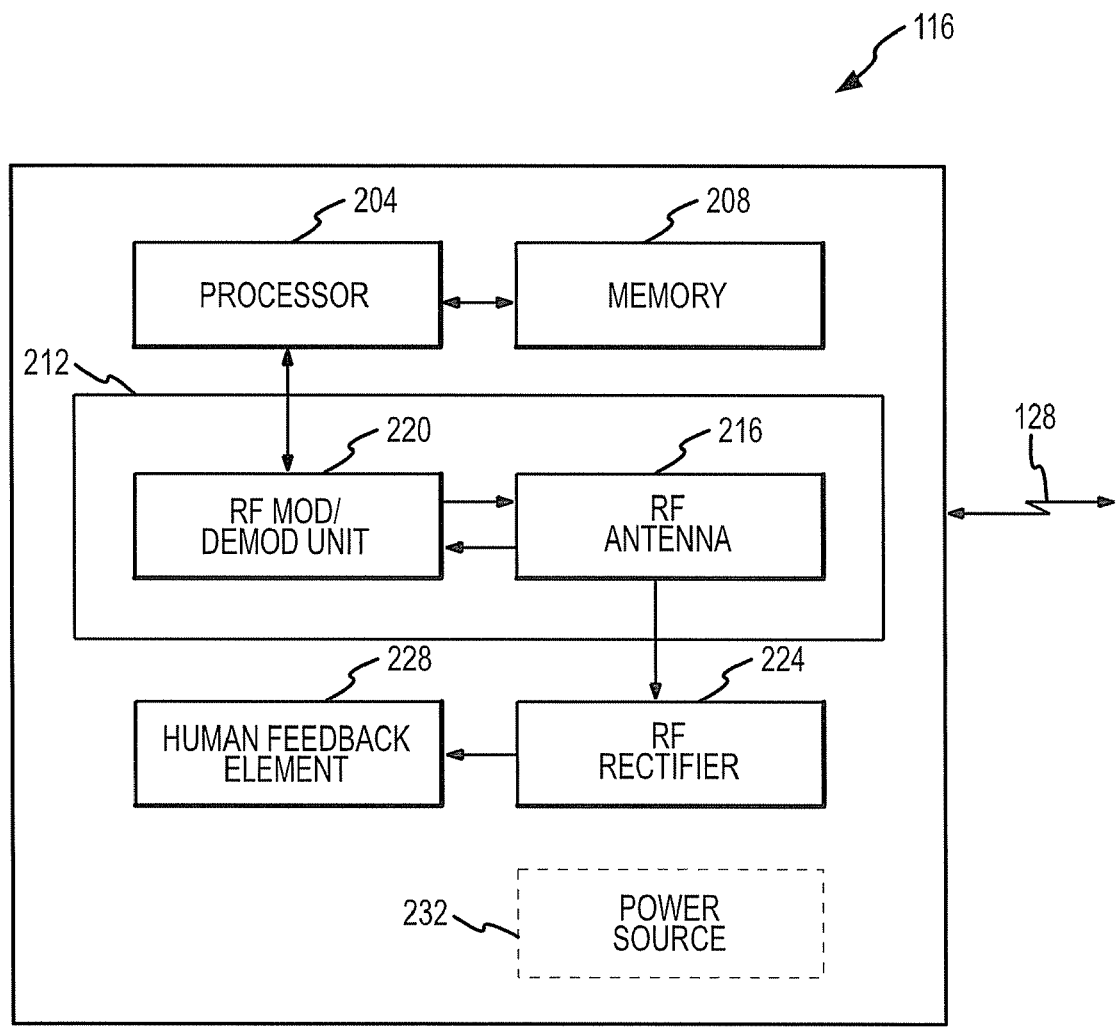
FIG. 2 is a block diagram depicting an exemplary RFID device with a human feedback element in accordance with embodiments of the present invention.

Referring now to FIG. 2, an exemplary RFID device 116 will be described in accordance with at least some embodiments of the present invention. In the depicted embodiment, the RFID device 116 comprises a processor 204, a memory 208, a send/receive unit 212 that includes an RF Antenna 216 and an RF Modulation/Demodulation Unit (MDU) 220, an RF rectifier 224, and a human feedback element 228. The processor 204 (e.g., application specific integrated circuit (ASIC), microprocessor, programmable controller, and the like) uses interfaces, which may be implemented as either bi-directional or unidirectional interfaces, to communicate with the memory 208 and MDU 220, respectively, to facilitate data exchanges in the RFID device 116 and wireless communications with an interrogator 112. In an alternate embodiment (not shown), at least portions of the MDU 220 may be incorporated in the processor 204.

The RFID device 116 may be fabricated as a system-on-chip (SoC) device, a system-in-package (SiP) device, or a system-in-module (SiM) device. In the SoC device, various functional components are integrated onto a single die. Accordingly, in SiP and SiM devices, several SoC devices are combined in a single package (SiP device) or an assembly including SoC and/or SiP devices (SiM device), respectively.

The antenna 216 of the RFID device 116 may be implemented as a loop of wire, a printed circuit, a stamped foil, printed conductive ink, or other type of similar structure and/or device that can convert magnet flux into an electrical signal.

In operation, the interrogator 112 and RFID device 116 use pre-programmed communication protocols. To increase probability of error-free reception, the same messages may redundantly be repeated a pre-determined number of times or during a pre-determined time interval. The interrogator 112 generates an interrogating RF signal. The interrogating RF signal of the interrogator 112 (or, in passive or semi-passive RFID devices, a portion of that signal) is received by the RFID antenna 216 and is forwarded to the MDU 220 that demodulates the RF signal and provides the demodulated signal for processing to the processor 204. When the received RF signal contains a request for data identifying the RFID device 116 and/or a holder of the RFID device, the controller accesses the memory 208 for this data and, via the MDU 220 and antenna 216, transmits the requested data to the interrogator 112.

The memory 208 of a passive RFID device generally comprises at least one array of non-volatile memory cells, e.g., static random access memory (SRAM) cells or FLASH memory cells, among other types of non-volatile memory cells. The memory 208 of an active RFID device may additionally comprise at least one array of dynamic random access memory (DRAM) cells. A content of at least a portion of the memory 208 may be pre-programmed and write-protected thereafter, whereas the content of other portions of the memory may selectively be modified or erased using the interrogator 112.

In accordance with embodiments of the present invention, the memory 208 may further comprise credential data and authenticating functions. Examples of credential data include, but are not limited to, assets the RFID device 116 has access to, times of allowed access to each asset, and other data that can help the RFID device 116 determine if it is eligible to gain access to a particular asset. The authenticating functions use the credential data to enable the RFID device 116 to make a determination of its own access rights with respect to an asset.

An RFID device 116 that determines its own access rights and permissions is typically referred to as a smart card or smart RFID device. In operation, a "smart" RFID device 116 is presented to an interrogator 112. The interrogator 112 is associated with one or more assets and the interrogator 112 is the gatekeeper of those assets. The interrogator 112 contains information about its associated assets and usually time of day information. Upon presentation of the RFID device 116 to the interrogator 112, the interrogator 112 supplies the asset information and, if necessary, time of day information to the RFID device 116. The RFID device 116 then analyzes the asset information and, if provided, time of day information using its credential data. The RFID device 116 then makes a determination whether it is allowed to access the given asset (e.g., whether the holder of the RFID device 116 can have access to a room behind a door, a financial account, computer files, etc.) If the RFID device 116 determines that it is allowed access to the particular asset, then it sends a signal back to the interrogator 112 indicating that validation of the RFID device 116 has been confirmed and access should be granted. Upon confirmation of validation of the RFID device 116, the interrogator 112 will unlock the door, access the financial account, permit access to the computer files, or perform the requisite steps to grant access to the holder of the RFID. If the RFID device 116 determines that it is not allowed access to the particular asset, then it can either do nothing or send a signal back to the interrogator 112 indicating that validation of the RFID device 116 was not confirmed and access should not be granted. Upon the receipt of this signal, the interrogator 112 may perform no action, generate a message indicating that access was not granted, sound an alarm, or perform some other sort of action in accordance with denying the holder of the RFID device 116 access to the asset.

A "passive" RFID device 116 uses RF signals (i.e., RF radiation) emitted by the interrogator 112 as a source of energy for powering the RFID device. When a passive RFID device comes within range of an interrogating reader, the reader provides power to the RFID device 116 via a querying RF signal. The passive RFID device 116 comprising the RF rectifier 224 converts a portion of RF power collected by the antenna 216 into DC power facilitating operability of the RFID device. Such a RFID device can operate only in the active zone of an interrogating reader and is inactive otherwise.

DC power generated by the RF rectifier may also be used to power the human feedback element 228. Examples of a suitable human feedback element 228 include, but are not limited to, an LED, an LCD display, an OLED, a speaker, a buzzer, a vibrator, or some other type of device or mechanism that can be used to communicate information to a holder of the RFID device 116. Each type of human feedback element 228 requires a different amount of power in order to function properly. For example, a single LED requires less power to function properly than does an LCD display. Based on power considerations and requirements, various configurations of a transponder integrated circuit (IC) 304 and the human feedback device 228 may be used in the RFID device 116.

Figure 3A:
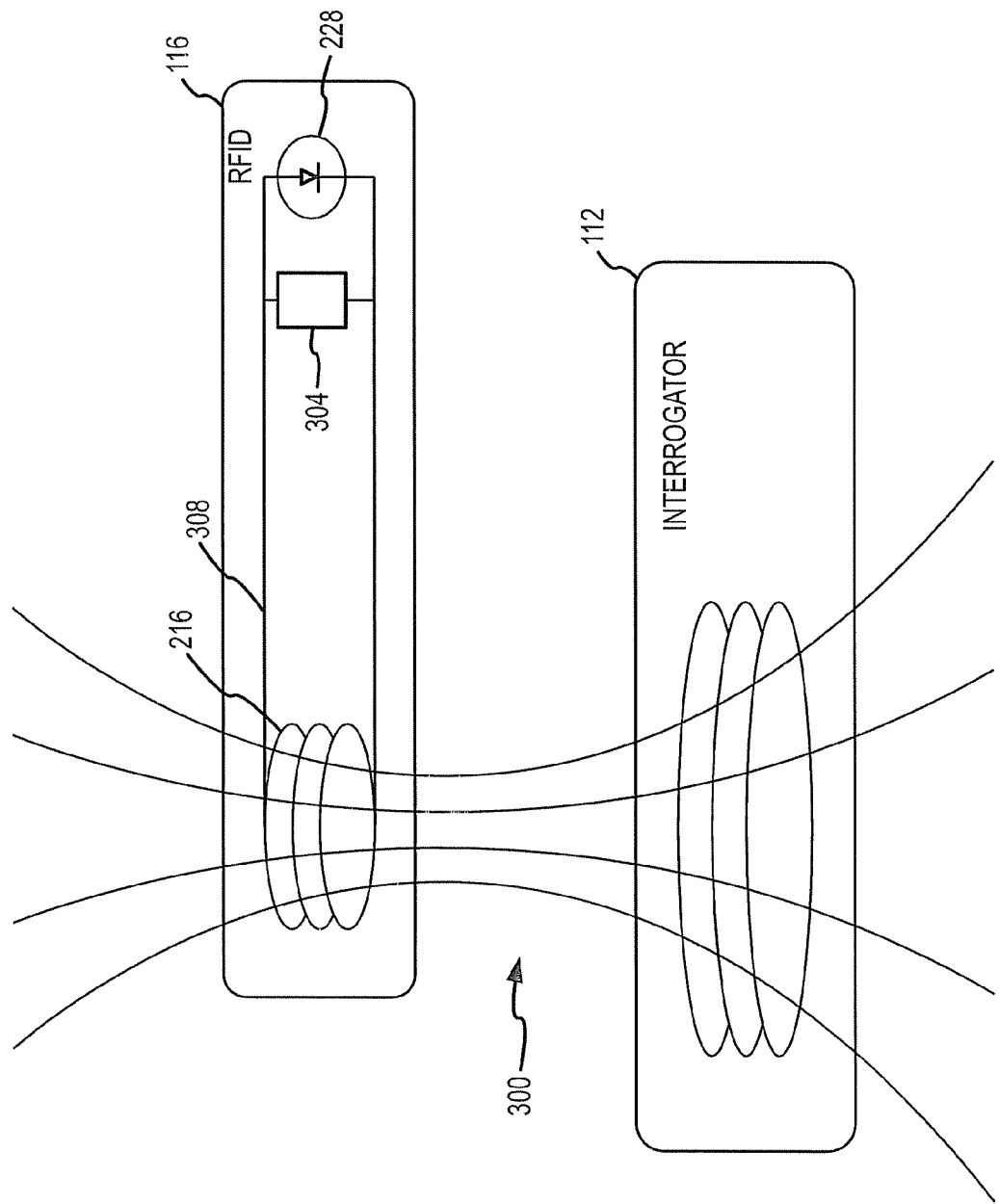
FIG. 3a is a block diagram depicting a possible circuit configuration for an RFID device using a single antenna to power a transponder integrated circuit (IC) and a human feedback element in accordance with embodiments of the present invention.
Figure 3B:
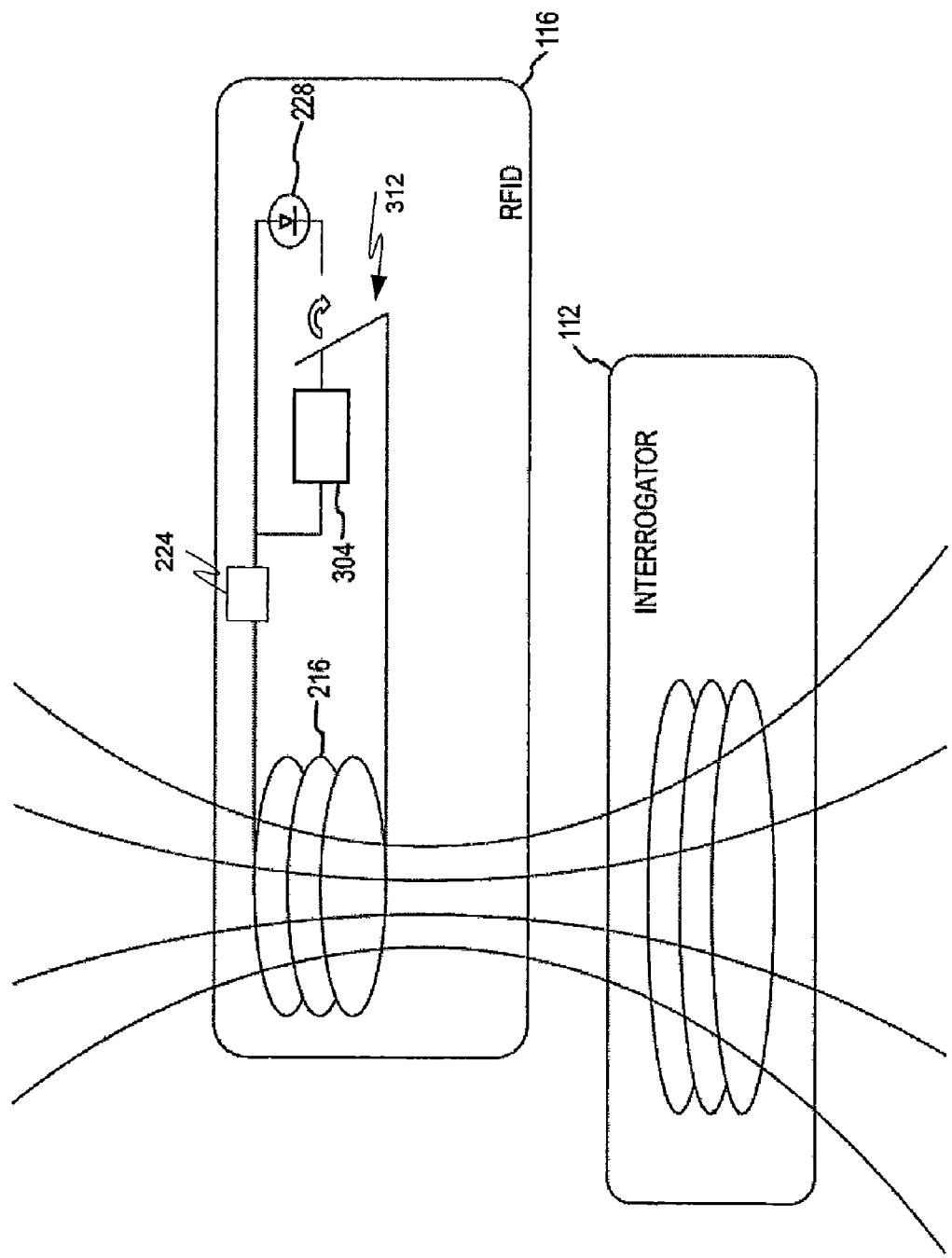
FIG. 3b is a block diagram depicting another possible circuit configuration for an RFID device using a single antenna to power a transponder IC and a human feedback element in accordance with embodiments of the present invention.

Referring now to FIGS. 3a and 3b, possible configurations of an RFID device 116 having a single RF antenna 216 will be discussed in accordance with embodiments of the present invention. An interrogator 112 generates magnetic field 300 as it emits RF signals from its antenna. When the RFID device 116 is placed within an active zone of the interrogator 112, energy from the magnetic field 300 can be transformed into electrical energy by the antenna 216. The rectifier 224 can convert the electrical energy into a form suitable for use by the human feedback element 228, i.e. convert from alternating current to a direct current. The rectifier 224 may be a bridge rectifier, half wave rectifier, a full wave rectifier, a diode bridge rectifier, and combinations thereof. In the embodiment depicted in FIG. 3a the electrical power is then supplied to the RF transponder IC 304 and the human feedback element 228, which is depicted as an LED. The RF transponder IC 304 generally comprises the MDU 220, the processor 204, and the memory 208. The transponder IC 304 and human feedback element 228 may be placed in parallel on a given circuit as shown, or may be placed in series, again depending on the various electronic considerations (e.g., required operating voltage, maximum current, required power, etc.). The rectifier 224 may be placed on the common line 308 coming from the antenna 216 such that the same amount of power is supplied to the transponder IC 304 and the human feedback element 228. Alternatively, each component may have a dedicated or partially dedicated rectifier 224 that supplies a modified amount of power to each component. For example, the transponder IC 304 may require a much larger amount of power to function than the human feedback element 228. Thus, the rectifier associated with the transponder IC 304 may have to supply more DC power from a given signal than does the rectifier associated with the human feedback element 228.

As can be seen in FIG. 3b, a switch 312 may be placed such that power is supplied to one component, for instance the transponder IC 304, for a given period of time. The switch 312 then transfers to a second state where power is supplied to the second component, for instance the human feedback element 228. This particular configuration may allow both components to run off of a single, smaller antenna 216 or may allow for operation of components requiring larger amounts of power from a single antenna 216 that may not otherwise be able to provide adequate power to both components simultaneously.

The sizing, type of material, and number of turns in the antenna 216 may also affect how much power can be supplied to each component as well. Typically, the larger number of turns in the antenna 216 results in an increased amount of energy transferred from the magnetic field 300 into electrical energy. Likewise, an antenna 216 with a larger radius will typically be able to convert more energy from the magnetic field 300 into electrical energy than would an antenna 216 with a smaller radius.

Figure 4:
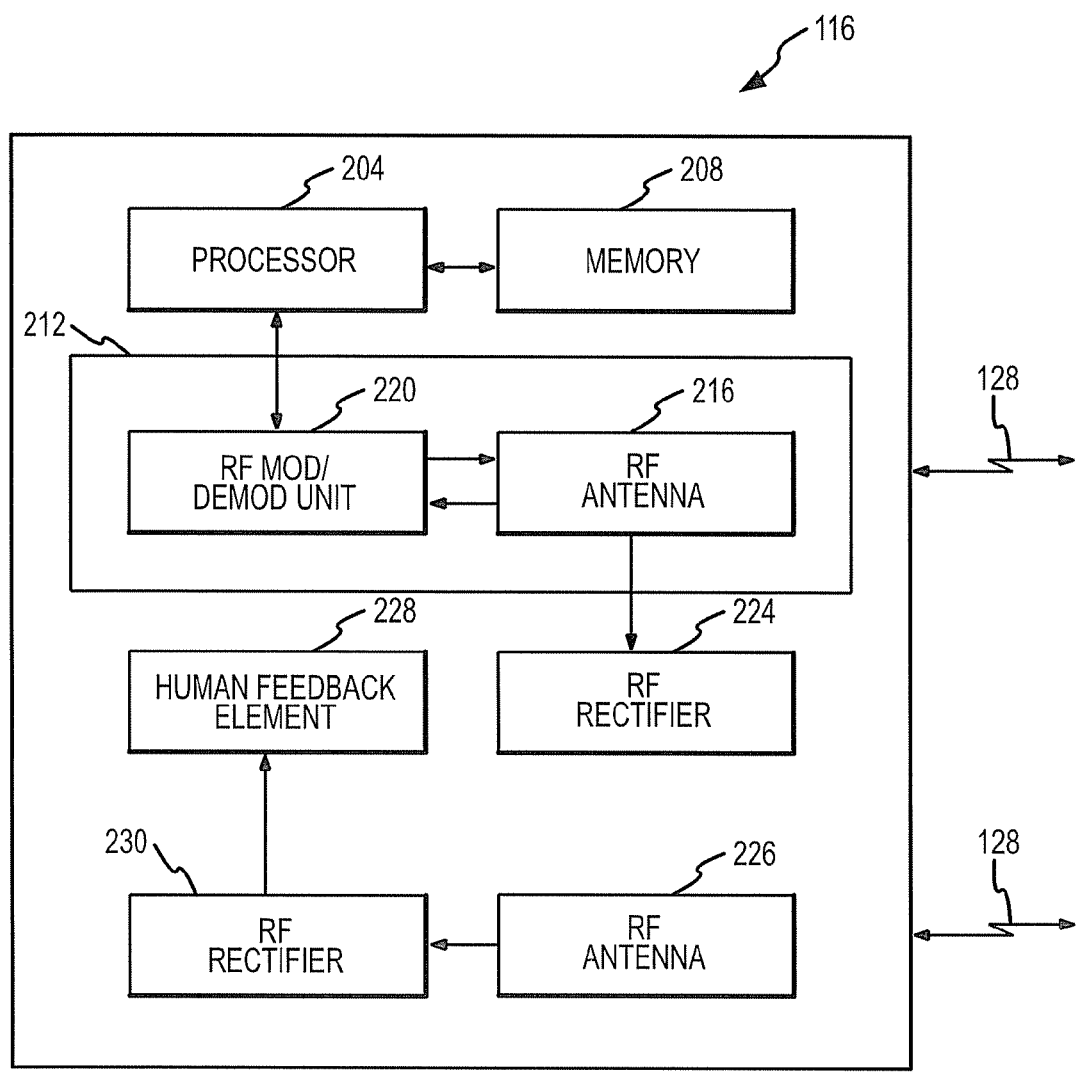
FIG. 4 is another block diagram depicting an exemplary RFID device having multiple antennae in accordance with embodiments of the present invention.

Referring now to FIG. 4, possible configurations of an RFID device 116 having multiple RF antennas 216 will be discussed in accordance with embodiments of the present invention. As noted above, certain operating considerations of the components in the RFID device 116 may determine what type and how many antennas 216 are required. The human feedback element 228 may require a separate RF antenna 226 and/or rectifier 224. The second RF antenna 226 functions similar to the first RF antenna 216 in that each can transform magnetic energy from the magnetic field 300 (e.g., changes in the magnetic field or magnetic flux) into electrical energy. By having two antennas, the transponder IC 304 and the human feedback element may be electrically isolated from each other, although doing so is not required. By having each component powered by their own antenna, components requiring larger amounts of power may be used.

Figure 5:
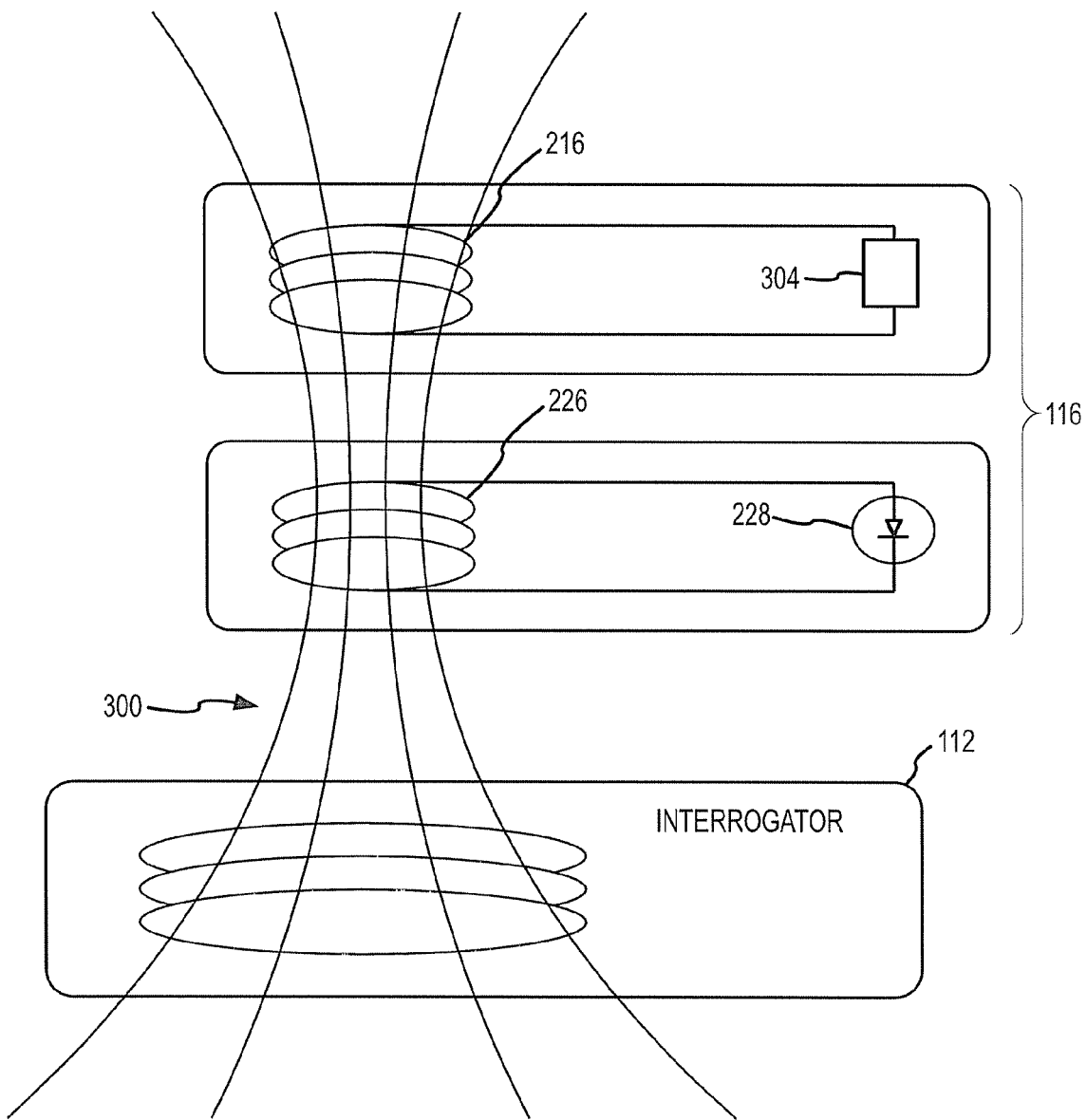
FIG. 5 is a block diagram depicting a possible circuit configuration for an RFID device using more than one antenna to power a transponder IC and a human feedback element in accordance with embodiments of the present invention.

As can be seen in FIG. 5, a magnetic field 300 is still generated by the interrogator 112. Each antenna 216 and 226 transforms the magnetic flux from the field 300 into electrical energy, i.e. alternating current. The rectifiers 224 and 230 rectify the alternating current into direct current. Of course, each antenna 216 and 226 may be connected to a common rectifier and each component (e.g., the transponder IC 304 and the human feedback element 228) may be connected to the same common rectifier. The components, although using separate antennas, may be packaged onto a single RFID device 116 or substrate.

Additional transponders may be implemented in the RFID device 116 that are each tuned to a different and/or the same frequency. For example, a first transponder may be tuned to 125 kHz, which is a popular frequency used by older legacy systems. A second transponder in the RFID device may be tuned to 13.56 MHz, which is a frequency commonly used in newer identification systems. Each transponder is tuned to their respective frequency, whether different or the same, by the design and choice of circuit components (e.g., resistor size and placement, capacitor size and placement, inductor size and placement, etc.) within each transponder's IC.

As used herein a "transponder" may include an integrated circuit (IC) or any other collection of active circuit elements working in cooperation to provide responses to interrogations from an interrogator or the like. Alternatively, the transponder may simply comprise inactive circuit elements or may comprise a digital signal processor or the like for performing enhanced functions.

The RFID device 116 may further comprise an optional power source 232. The power source 232 may be in the form of a rechargeable battery, a capacitor, or other type of electrical energy storage device. A portion of energy collected from the antennas 216 and/or 226 may be sent to the energy storage device such that it may be used at a later time. Thus, components in the RFID device 116 may utilize the stored electrical energy under control of the processor 204 or an additional logic element when the RFID device 116 is not in the presence of a magnetic field. The use of an energy storage device may also allow each component in the RFID device 116 to receive power that is less dependent upon the magnetic field. For example, when a large influx of magnetic energy is converted to electrical energy, that electrical energy may be stored and distributed to components of the RFID device 116 evenly over a period of time. The energy storage device may further act as a power surge protector for various components.

The RFID device 116 may be adapted such that it can be affixed or made integral to part of a garment or material. The RFID device 116 may also be embedded into an object such as a doll, action figure, container, mechanical key, game board, or other type of object. The RFID device 116 may be implemented as a part of a game in order to create an object that provides the user with some sort of response that can be detected by a human during play. Toys may be made that have an RFID device with a human feedback element, which may be used to create an interactive toy that performs a particular type of action when passed through a given magnetic field. The human feedback element may be one or several servomotors that move various parts of the toy based on the type of field that the RFID device has been passed across.

One example of an interactive game or toy that may include a board game with a number of different stations placed throughout the board. The stations may include a transponder or the like for communicating with RFID devices. Each player may use a game piece that includes an RFID device in accordance with at least some embodiments of the present invention. As the game progresses, players move their respective game pieces around the game board. When a particular game piece is brought within the active zone of a station (i.e., interrogator), the game piece may react in a certain way to the station based upon the field that is being created by the station. Each reaction may be unique to each station and thus may enhance the overall enjoyment of the game because reactions of game pieces to stations may be situational to reflect a state of the game.

Figure 6:
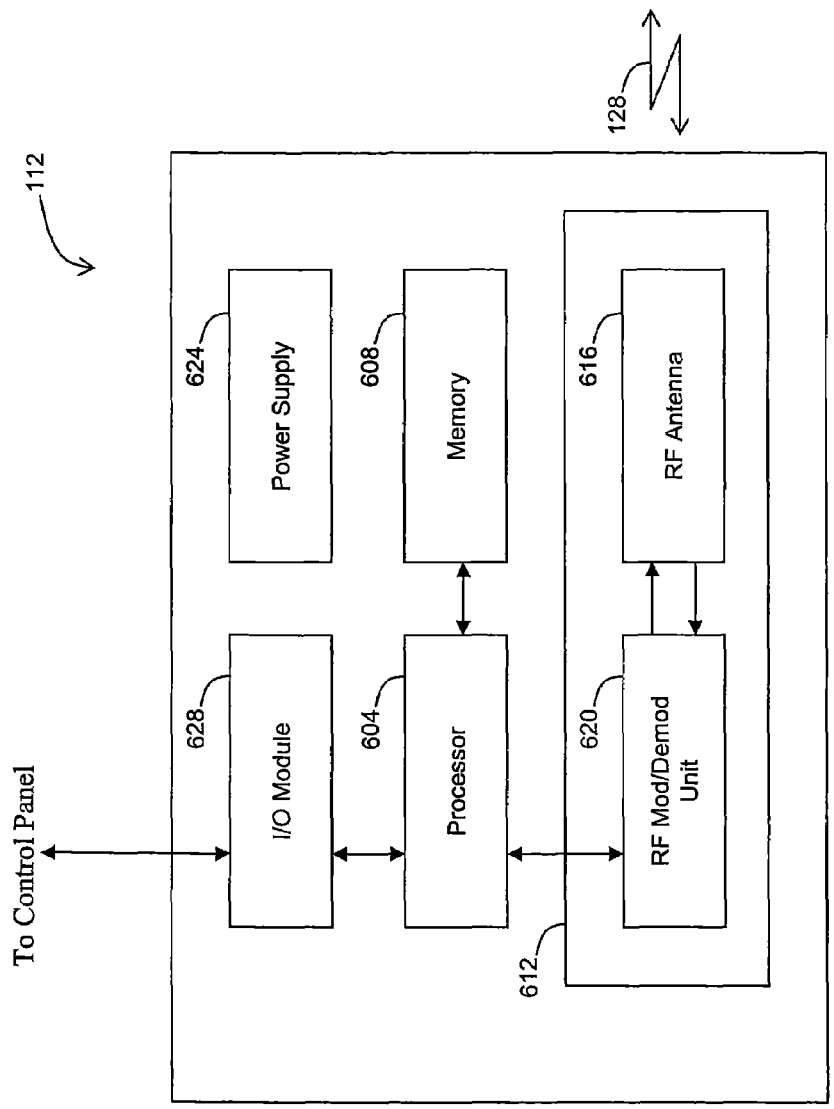
FIG. 6 is a block diagram depicting an exemplary interrogator in accordance with embodiments of the present invention.

Referring now to FIG. 6, an exemplary interrogator 112 will be described in accordance with at least some embodiments of the present invention. In the depicted embodiment, the interrogator 112 comprises a processor 604, a memory 608, a RF receiver/transmitter 612 including a RF modulator/demodulator unit (MDU) 620 and a RF antenna 616, an input/output (I/O) module 628 coupling the reader to the control panel 104, and a power supply 624. Similar to the RFID device 116, the interrogator 112 or portions thereof may be fabricated as a SoC, SiP, or SiM device.

The processor 604 (e.g., microprocessor, application specific integrated circuit (ASIC), and the like) uses interfaces, which may be implemented as either bi-directional or unidirectional interfaces, to communicate with the memory 608 and MDU 620 for facilitating data processing in the interrogator 112 and establishing wireless communications with the RFID device 116 being interrogated. In an alternate embodiment (not shown), at least portions of the MDU 620 may be incorporated in the processor 604. The memory 608 generally comprises software routines facilitating, in operation, predetermined functionality of the interrogator 112. The memory 608 may be implemented using various types of electronic memory discussed above in reference to FIG. 2 and/or magnetic or optical memory (e.g., hard drive, optical drive, floppy disk, and the like).

An interrogator 112 may also be implemented as a stand-alone reader/interrogator. A stand-alone reader usually performs the functions of both an interrogator 112 and a control panel 104 using the same or additional processors 604. The memory 608 available to a stand-alone interrogator also comprises authentication verification information. Thus, the interrogator 112 does not have to ask any remote device in the system 100 for help in validating, or invalidating, an RFID device 116 presented thereto. Typically, all of the components are located within the same unit or housing. Upon verification of the validity of an RFID device 116, the interrogator 112 is further operable to initiate actions that allow the holder of the RFID device 116 access to an asset associated with the interrogator 112. Likewise, upon determining that the RFID device 116 is invalid or not permitted to access a particular asset, the interrogator 112 can initiate and perform actions concurrent with such a determination.

The interrogator 112 initially creates a magnetic field that is used to power the RFID device 116. The interrogator 112 also communicates with the RFID transponder at a given frequency. During this communication, the interrogator 112 typically requests information from the RFID device 116 (e.g., identification information like device serial number, device manufacturer number, holder name, holder title, holder social security number, and other pertinent information that may be used by the interrogator to determine the identity of the device or holder of the device). A properly functioning RFID device 116 typically transmits the requested information back to the interrogator 112 via at least one of the communication frequencies. The interrogator 112, receives the signal at its antenna 616 and forwards it on to the MDU 620, where the signal is demodulated. The demodulated signal is forwarded to the processor 604. The processor 604 analyzes the received signal in an attempt to determine the identity of the RFID device 116 and/or holder of the RFID device 116 using data stored in memory 608 or the database 132. As noted above, the signal may be forward to the control panel 104 to make this determination. Once the holder of the RFID device 116 is identified, the interrogator 112 may make a decision, or be instructed by the control panel 104, to allow the holder of the RFID device 116 access to the asset associated with the interrogator 112.

In accordance with embodiments of the present invention, the interrogator 112 may be used to control at least the human feedback element 228 that resides on the RFID device 116. The interrogator 112 may determine, or be instructed by the control panel 104, to control the human feedback element 228 of the RFID device 116. The interrogator 112 may control the human feedback element 228 by altering the amount of energy transmitted by the RF antenna 616. This will in turn alter the magnetic field that is sent to the RFID device, and will then alter the amount of energy supplied to the human feedback element 228. The interrogator 112 may pulse the magnetic field such that a light blinks according to a particular fashion. The way in which the interrogator 112 controls the human feedback element 228 may depend on the results of the analysis of the information received from the RFID device 116. For example, if the interrogator 112 verified the authenticity of the RFID device 116, then it may cause the human feedback element 228 to have a particular reaction (e.g., blink once, blink multiple times, display "verified", beep once, sound out "verified", change the RFID device 116 to a particular color, vibrate a certain number of time, and so on).

The RFID device 116 may also simply send a command to the interrogator 112, asking for a verification of firmware on the interrogator 112. If the interrogator 112 has the proper firmware it will typically know the correct response to the RFID device's 116 command and will control the human feedback element 228 accordingly. However, if the interrogator 112 is loaded with copied, pirated, or other type of unauthorized firmware, the interrogator 112 may not be able to control the human feedback element 228 properly. This will allow the holder of the RFID device 116 to quickly know that the interrogator 112 has been loaded with uncertified firmware or is not functioning properly.

Figure 7:
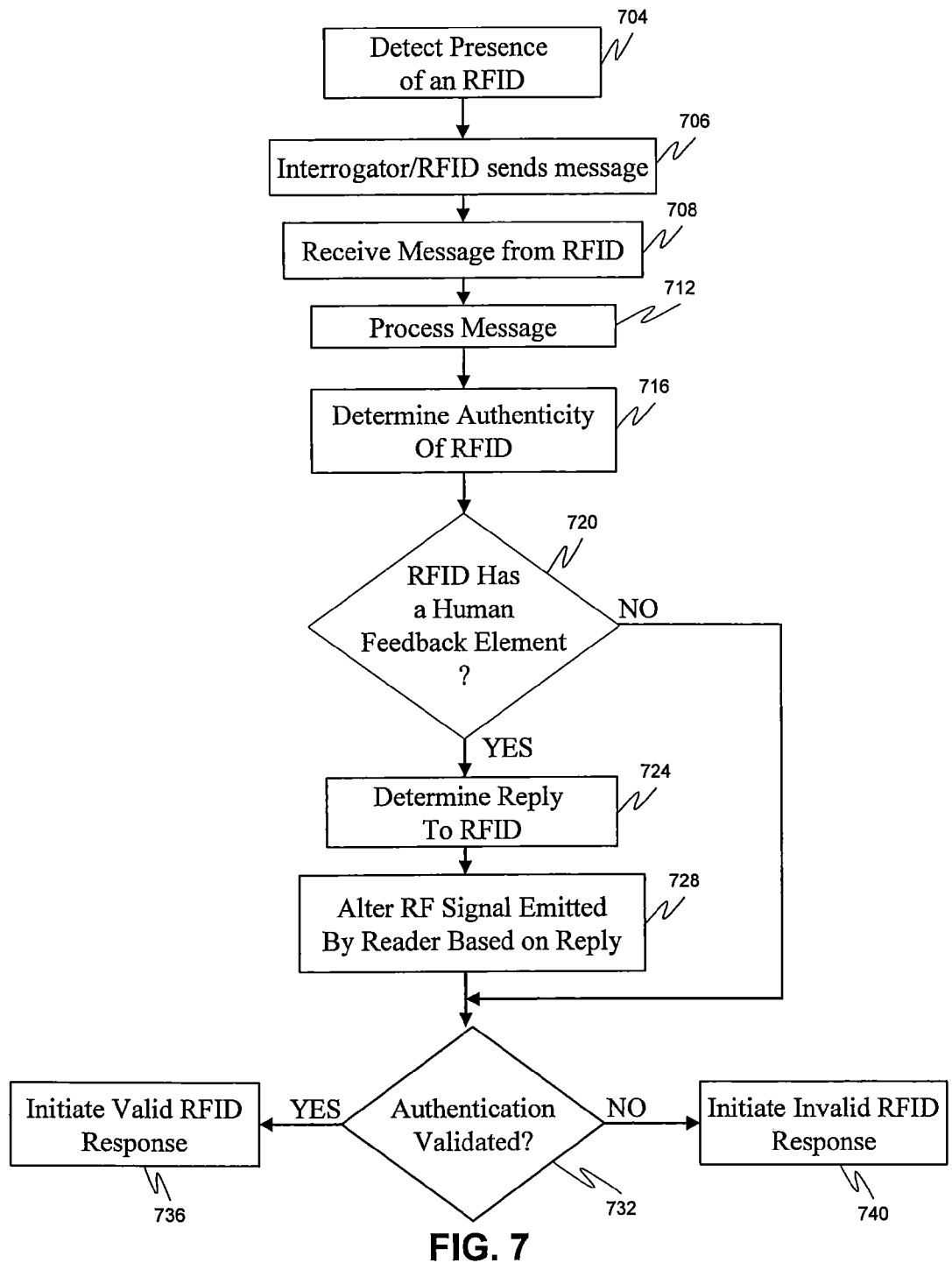
FIG. 7 is a flow chart depicting a method of communicating with and/or controlling an RFID device that has a human feedback element in accordance with embodiments of the present invention.

Referring now to FIG. 7, a method of authenticating an RFID device 116 and/or controlling a human feedback element 228 with an interrogator 112 will be described in accordance with at least some embodiments of the present invention. Initially, the interrogator 112 detects the presence of an RFID device 116 (step 704). Usually, an RFID device 116 can be detected at the interrogator 112 by an increase in power consumption. Basically, more power is now being used because the interrogator 112 is supplying power to the RFID device 116 through the magnetic field 300. Once the presence of an RFID device 116 has been detected, the interrogator may send a message to the RFID device 116 requesting certain information. Alternatively, the RFID device 116 may detect that it is in the presence of an interrogator 112 and generate a message without a prompt from the interrogator (step 706). A message is then sent from the RFID device 116 to the interrogator 112, whether it was prompted or not (step 708). The message may contain identification information that is to be analyzed by the interrogator 112. The message may also contain commands and the like from the RFID device 116, asking the interrogator 112 to perform some sort of function (e.g., status check, software check, hardware check, identity check, or the like). The interrogator 112 receives the message and begins processing the message (step 712). In processing the message the interrogator 112 may determine to send some identification information to the control panel 104 or perform the processing internally. Again, part of the processing may be to determine what types of commands the interrogator 112 has been given by the RFID device 116. The authenticity of the RFID device 116 is then determined in step 716. As noted above, a determination of authenticity may be made at the control panel 104 or may be made at the interrogator 112, particularly when the interrogator 112 is a stand-alone interrogator.

In step 720, it is determined if the RFID device has a human feedback element 228. If the identified RFID device 116 does have a human feedback element 228, then the interrogator 112 and/or the control panel 104 determines a suitable reply for the RFID device based upon the processing of the message (step 724). The reply may depend on the type of human feedback element that is employed by the RFID device 116. The reply may also include information about the interrogator 112 like, what sort of software/firmware is used by the interrogator 112, if all of the systems of the interrogator 112 are functioning properly, what the date is, and any other suitable response to the RFID device 116. Then, based on the determined response, the interrogator 112 controls the human feedback element 228 by, for example, altering the magnetic field generated by the interrogator 112. The interrogator 112 may also send a logic signal for the human feedback element 228 to display. The interrogator 112 may further increase the amount of energy in the magnetic field if it determines that the human feedback element 228 is one that will require additional power. For example, if the human feedback element 228 is an LCD display, the interrogator 112 may alter the amplitude of the magnetic field 300 and send a signal back to the RFID device 116 to be displayed by the LCD display. As can be appreciated, the interrogator 112 may further alter the frequency and/or phase of the magnetic field 300 to further create a unique response for the human feedback element 228. Alternatively, if the human feedback element 228 is a buzzer, the interrogator 112 may alter the magnetic field 300 to generate a series of beeps to be sounded by the buzzer. If the RFID device does not have a human feedback element 228 it is unnecessary to determined responses for the human feedback element and the method will skip steps 724 and 728.

In step 732 it is determined if the authenticity of the RFID device 116 has been validated. Of course, a suitable response to the RFID device 116 may not have required validation of its authenticity. Rather, only a reply to the RFID device 116 may have been necessary. However, if the RFID device 116 is attempting to gain access to a particular asset associated with the interrogator 112, then the authentication of the RFID device 116 should be validated prior to admitting access to the asset. If the RFID device 116 is authorized to gain access to the asset associated with the interrogator 112, then a response consistent with the presence of a valid RFID is initiated (step 736). Examples of a valid RFID response include, but are not limited to, opening a door, unlocking a door, accessing a financial account, accessing computer files, allowing access to data, and the like. However, if the authenticity of the RFID device 116 is not validated, then an invalid RFID response is initiated (step 740). Examples of an invalid RFID response include, but are not limited to, locking a door, sounding an alarm, notifying security personnel, disabling the interrogator 112, and other actions agreeing with determining a credential is invalid known to those of skill in the art.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A Radio Frequency Identification (RFID) device, comprising:
   a transponder integrated circuit;
   a human feedback element;
   a first antenna operable to transform magnetic flux from a magnetic field into an electrical signal having electrical energy, wherein said electrical energy is used to power at least a portion of said transponder integrated circuit; and
   wherein said field is generated by an interrogator and includes information about the interrogator, the information about the interrogator having been provided by the interrogator in response to the interrogator performing at least one of a status check, hardware check, software check, and identity check, and wherein the human feedback element is operable to alter a presentation of information based upon the field generated by the interrogator.

2. The device of claim 1, wherein said interrogator controls said human feedback element in response to receiving a prompt from said RFID device.

3. The device of claim 2, wherein said prompt comprises the at least one of a status check request, software check request, hardware check request, and identity check request.

4. The device of claim 1, further comprising a second antenna operable to transform magnetic flux from said magnetic field into an electrical signal having electrical energy, wherein electrical energy supplied from said first antenna is used to power at least a portion of said transponder integrated circuit, and wherein electrical energy supplied from said second antenna is used to power at least a portion of said human feedback element.

5. The device of claim 1, further comprising a rectifier residing between said first antenna and at least one of said transponder integrated circuit and human feedback element that is operable to change said electrical signal into a second electrical signal that can be used by said at least one of said transponder integrated circuit and human feedback element.

6. The device of claim 5, wherein said second electrical signal is a direct current signal.

7. The device of claim 1, wherein said human feedback element is used to display a portion of memory contents of said RFID device.

8. The device of claim 1, wherein said human feedback element comprises at least one of a speaker, buzzer, LED, OLED, LCD display, and vibrator.

9. The device of claim 1, wherein said first antenna comprises at least one of a loop of wire, printed circuit, stamped foil, and printed conductive ink.

10. The device of claim 1, wherein said transponder integrated circuit operates at one or more frequencies and/or modulation techniques.

11. The device of claim 1, wherein said RFID device comprises at least one of a contact smart card, a contactless smart card, a proximity card, a magnetic stripe card, a Wiegand card, a PDA, a cellular phone, a sticker, a label, and a key-fob.

12. The device of claim 1, wherein said RFID device is operatively associated with a toy.

13. The device of claim 12, wherein said toy is at least one of a doll, an action figure, a game board, and a mechanical key.

14. The device of claim 1, further comprising an electrical storage device that comprises at least one of a battery and a capacitor.

15. The device of claim 1, further comprising a switch that, when positioned in a first position, allows energy to be transferred to the transponder integrated circuit, and when positioned in a second position, allows energy to be transferred to the human feedback element.

16. The device of claim 1, wherein said electrical energy is used to power at least a portion of said human feedback element.

17. The device of claim 1, further comprising a power source, wherein said power source is used to power at least a portion of said human feedback element.

18. A method of communicating with an interrogator via a Radio Frequency Identification (RFID) device, wherein the RFID device comprises a RFID transponder and a human feedback element that are each at least partially powered by energy supplied by a magnetic field created by said interrogator, the method comprising:
placing said RFID device within an active region of said interrogator;
generating a message to send to said interrogator;
transmitting said message from said RFID device;
receiving a reply from said interrogator in the form of an altered magnetic field, wherein the reply comprises information about the interrogator, the information about the interrogator having been generated by the interrogator in response to the interrogator performing a status check, hardware check, software check, and/or identity check; and
indicating results of said reply with said human feedback element.

19. The method of claim 18, wherein said transmitted message comprises at least one of a status check request, software check request, hardware check request, and identity check request.

20. The method of claim 18, wherein said RFID device further comprises an antenna that is operable to transform magnetic flux from said magnetic field into an electrical signal having electrical energy, and wherein energy supplied from said antenna is used to power at least a portion of said transponder and said human feedback element.

21. The method of claim 20, further comprising a rectifier residing between said antenna and at least one of said transponder and said human feedback element that is operable to change said electrical signal into a second electrical signal that can be used by at least one of said transponder and human feedback element.

22. The method of claim 20, wherein said antenna comprises at least one of a loop of wire, printed circuit, stamped foil, and printed conductive ink.

23. The method of claim 18, wherein said human feedback element comprises at least one of a speaker, buzzer, LED, OLED, LCD display, and vibrator.

24. The method of claim 18, wherein said transponder operates at one or more frequencies and/or modulation techniques.

25. The method of claim 18, wherein said RFID device comprises at least one of a contact smart card, a contactless smart card, a proximity card, a magnetic stripe card, a Wiegand card, a PDA, a cellular phone, a sticker, a label, and a key-fob.

26. The method of claim 18, further comprising:
said interrogator controlling said human feedback element by altering the magnetic field;
said human feedback element displaying the results of the interrogator controlling the human feedback element.

27. The method of claim 18, further comprising determining whether the interrogator is an authorized interrogator based upon the reply received from the interrogator.

28. The method of claim 18, further comprising partially powering the RFID device with an active power source.

29. A method of controlling a human feedback element associated with a Radio Frequency Identification (RFID) transponder, comprising:
(a) providing a magnetic field;
(b) receiving a message from the transponder, wherein the transponder is located in the magnetic field;
(c) in response to receiving said message, generating a response; and
(d) transmitting said response, wherein said response comprises altering a magnetic field in order to control the human feedback element, and wherein said altering of said magnetic field comprises at least one of (i) intermittently generating and not generating said magnetic field and (ii) changing the magnitude of said magnetic field.

30. The method of claim 29, further comprising analyzing said message to determine a valid response.

31. The method of claim 29, wherein said altering of said magnetic field comprises intermittently generating and not generating said magnetic field.

32. The method of claim 29, wherein said altering of said magnetic field comprises changing the magnitude of said magnetic field.

33. The method of claim 29, wherein said message received from said transponder comprises at least one of a status check request, software check request, hardware check request, and identity check request.

34. The method of claim 29, wherein said human feedback element comprises at least one of a speaker, buzzer, LED, OLED, LCD display, and vibrator.

35. The method of claim 29, wherein both the transponder and the human feedback element are operatively associated with a common substrate, and wherein said substrate comprises at least one of a contact smart card, a contactless smart card, a proximity card, a magnetic stripe card, a Wiegand card, a PDA, a cellular phone, a sticker, a label, and a key-fob.

36. The method of claim 29, both the transponder and the human feedback element are operatively associated with a common substrate, and wherein said substrate is operatively associated with a toy.

37. The method of claim 36, wherein said toy is at least one of a doll, action figure, game board, and mechanical key.

38. The method of claim 29, further comprising determining an authenticity of said RFID transponder.

39. The method of claim 29, further comprising determining an authenticity of an interrogator based on a response displayed by said human feedback element.

40. The method of claim 29, wherein the magnetic field of steps (a) and (d) are the same magnetic field.

41. The method of claim 29, further comprising providing an active power source associated with the human feedback element for powering the human feedback element.

42. A system, comprising:
an interrogator operable to generate a magnetic field; and
at least one Radio Frequency Identification (RFID) device comprising:
a transponder integrated circuit;
a human feedback element; and
a first antenna operable to transform magnetic flux from said magnetic field into an electrical signal having electrical energy, wherein said electrical energy is used to power at least a portion of said transponder integrated circuit, wherein said interrogator controls said human feedback element by at least one of (i) intermittently generating and not generating said magnetic field and (ii) changing the magnitude of said magnetic field.

43. The system of claim 42, wherein an altering of said magnetic field comprises intermittently generating and not generating said magnetic field.

44. The system of claim 42, wherein an altering of said magnetic field comprises changing the magnitude of said magnetic field.

45. The system of claim 42, wherein said interrogator controls said human feedback element in response to receiving a prompt from said RFID device.

46. The system of claim 45, wherein said prompt comprises at least one of a status check request, software check request, hardware check request, and identity check request.

47. The system of claim 42, wherein said interrogator is operable to alter said magnetic field in order to control said human feedback element such that the authenticity of said interrogator can be determined by a user of said RFID device.

48. The system of claim 42, wherein said interrogator receives a message from said RFID device comprising identification information, and wherein said interrogator is operable to analyze said identification information in order to determine an authenticity of said RFID device.

49. The system of claim 42, wherein said human feedback element is used to display a portion of memory contents of said RFID device.

50. The system of claim 42, wherein said human feedback element is used to display a portion of memory contents of said interrogator.

51. The system of claim 42, wherein said human feedback element comprises at least one of a speaker, buzzer, LED, OLED, LCD display, and vibrator.

52. The system of claim 42, further comprising a control panel that is operable to analyze a portion of a message received at said interrogator.

53. The system of claim 42, wherein said interrogator is a stand-alone interrogator.

54. The system of claim 42, wherein said electrical energy is used to power at least a portion of said human feedback element.

55. The system of claim 42, further comprising an active power source, wherein said active power source is used to power at least a portion of said human feedback element.

56. The system of claim 42, wherein said human feedback element is connected to said first antenna, and wherein said human feedback element receives at least a portion of its required power from said first antenna.

57. The system of claim 42, wherein said human feedback element is connected to a second antenna, and wherein said human feedback element receives at least a portion of its required power from said second antenna.

* * * * *

UNITED STATES PATENT AND TRADEMARK OFFICE
CERTIFICATE OF CORRECTION

PATENT NO.       : 7,586,413 B2
APPLICATION NO.  : 11/464739
DATED            : September 8, 2009
INVENTOR(S)      : Michael L. Davis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 285 days.

Signed and Sealed this

Fourteenth Day of December, 2010

David J. Kappos
*Director of the United States Patent and Trademark Office*